United States Patent [19]

Kodera et al.

[11] 4,014,091

[45] Mar. 29, 1977

[54] METHOD AND APPARATUS FOR AN ELECTRET TRANSDUCER

[75] Inventors: Yoichi Kodera; Tetsuo Toyoda, both of Yokohama, Japan

[73] Assignee: Sony Corporation, Tokyo, Japan

[22] Filed: Aug. 22, 1972

[21] Appl. No.: 282,765

[30] Foreign Application Priority Data

Aug. 27, 1971 Japan .............................. 46-65679

[52] U.S. Cl. .................................... 29/592; 29/594; 307/88 ET; 179/100.41 B; 179/111 E; 156/322; 156/285; 156/252

[51] Int. Cl.[2] ...................... H01S 4/00; H04R 31/00

[58] Field of Search ......... 29/592, 594; 307/88 ET; 179/100.41 B, 111 E; 156/322, 285, 250, 252

[56] References Cited

UNITED STATES PATENTS

| | | | |
|---|---|---|---|
| 2,284,039 | 5/1942 | Bruno | 179/111 E |
| 2,906,658 | 9/1959 | Doban | 156/322 |
| 3,130,101 | 4/1964 | Gittins et al. | 156/285 |
| 3,276,031 | 9/1966 | Gaynor | 346/74 |
| 3,373,251 | 3/1968 | Seeler | 307/88 ET |
| 3,575,762 | 4/1971 | Goehring et al. | 156/322 |

FOREIGN PATENTS OR APPLICATIONS

| | | | |
|---|---|---|---|
| 1,230,404 | 5/1971 | United Kingdom | 307/88 ET |

*Primary Examiner*—C.W. Lanham
*Assistant Examiner*—Daniel C. Crane
*Attorney, Agent, or Firm*—Hill, Gross, Simpson, Van Santen, Steadman, Chiara & Simpson

[57] ABSTRACT

An improved method for making a backplate assembly for an electret transducer used in a microphone wherein a synthetic resin film such as polytetrafluoroethylene or fluorinated ethylene-propylene copolymer is attached to a plate member having a flat conductive surface and which has been heated so as to securely attach the film thereon and charging said synthetic film to form an electret.

7 Claims, 9 Drawing Figures

Fig. 1
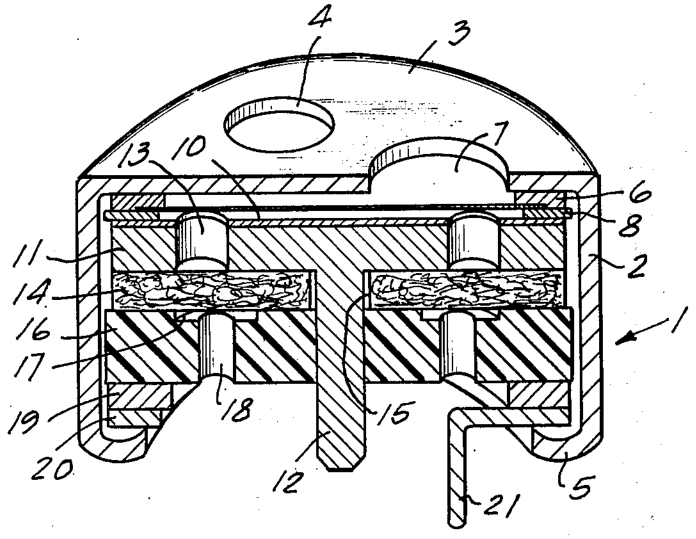
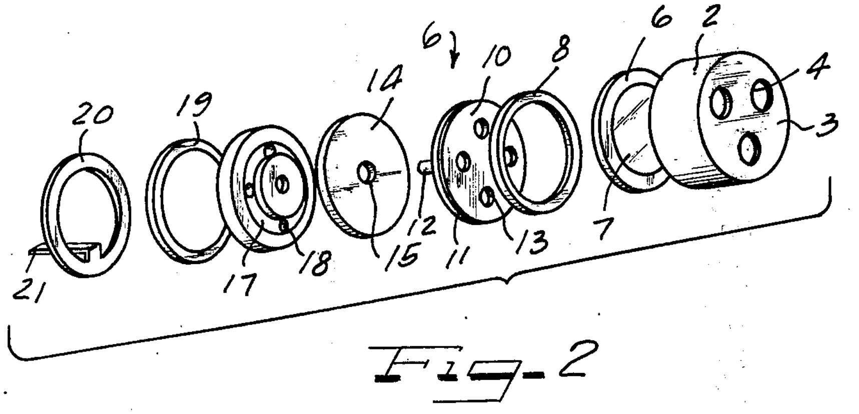
Fig. 2

METHOD AND APPARATUS FOR AN ELECTRET TRANSDUCER

BACKGROUND OF THE INVENTION

1. Field of the Invention

This invention relates in general to methods of making electret transducers and in particular to a method of making a backplate assembly for an electret transducer.

2. Description of the Prior Art

Electret transducers have been utilized in microphones and earphones and a common form utilizes a metallized thin plastic diaphragm which is supported in tension adjacent a conductive backplate. The diaphragm has a permanent charge on it so that no external D.C. bias is required for such electret transducers.

Diaphragms made of polytetrafluoroethylene or fluorinated ethylene-propylene copolymers produce stable electrets,. however, the mass of such materials is so large that electret tranducers with such diaphragms have a narrower frequency response than conventional condenser transducers utilizing a diaphragm made of titanium or a metallized diaphragm made of polyethylene terephthalate (T. M. Myler). Thus good results have been obtained with a conventional diaphragm mounted close to a backplate assembly which has a conductive surface and an electret film attached to the conductive surface. The electret film is secured to the conductive surface by conventional adhesives and the bond between the electret film and conductive surface has been poor in prior art devices. The bonding between the electret film and the conductive surface has been particularly poor after being charged at high temperatures such as 100° C. and after the electret transducers have been used for a period of time.

Thus, such electret transducers of the prior art have not been used in practice.

SUMMARY OF THE INVENTION

It is the main object of the present invention to provide a method of constructing an electret transducer which has a wide frequency response. Another object of the invention is to provide a method of making an electret transducer which has an electret film firmly secured on a backplate.

In the present invention, a synthetic resin film is secured to a backplate to form an electret wherein the resin sheet may be made of polytetrafluoroethylene or fluorinated ethylene-propylene copolymer (Teflon FEP T.M.) which is then forced down by air pressure against the backplate and slightly heated whereby the sheet is firmly attached to the backplate. The backplate is heated to the temperature range of 280° C.–400° C. and suction is applied to the other side of the backplate so as to form holes in the film in alignment with holes in the backplate and the backplate with the film is subjected to a voltage between 7 K and 10 K volts to cause a corona discharge thus to produce a surface charge density of $10^{-4}$ q/m$^2$ and render it as an electret transducer.

Another method of the invention is heating a metal plate and then apply synthetic resin film as defined above to the plate to bond them together and then punching the plastic and metal plate with a die or punching machine so as to form backplates.

Other objects, features and advantages of the invention will be readily apparent from the following description of certain embodiments thereof taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a cut-away sectional view of an electret microphone according to this invention;

FIG. 2 is an exploded view of the microphone of FIG. 1;

DESCRIPTION OF THE PREFERRED EMBODIMENTS

Figure 3:
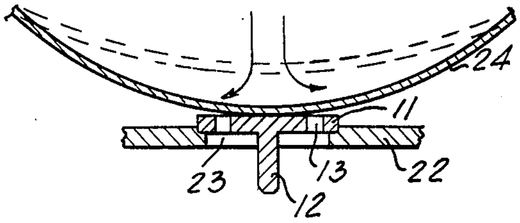
FIGS. 3–6 illustrate steps in forming an electret backplate according to the invention.

FIG. 1 is a sectional view of an electret microphone having unidirectional characteristics constructed according to the present invention. The microphone is designated generally by numeral 1 and comprises a cylindrical metal housing 2 which has an end cover 3 in which openings 4 are formed for receiving sound therethrough. A ring 6 is mounted within the housing 2 against the end member 3 and a diaphragm 7 of synthetic resin film which is metallized on one side thereof is connected to the electrically-conductive ring 6 by a conductive adhesive so as to connect the metallized surface of the film 7 with the ring 6 and to the end 3 of the housing 2. The diaphragm 7 may also be made of titanium foil rather than metallized synthetic resin film if desired.

A backplate designated generally as 9 is supported within the housing 2 adjacent the diaphragm 7 and might be constructed of metal, as for example aluminum, which consists of a disk plate 11 in which openings 13 are formed. A central electrode 12 extends from the plate 11 on the side opposite the diaphragm 7. An insulating spacer ring 8 is mounted between the diaphragm 7 and an electret film 10 which is attached to the surface of the plate 11 which faces the diaphragm 7. Openings are formed in the film 10 in alignment with the opening 13 in the plate 11. A spacer disk 14 of felt comprises a filter and serves as an acoustic resistance and prevents dust from passing into the microphone.

An insulating plate 16 made of synthetic resin and formed with a central opening 15 through which the electrode 12 extends fits against the disk 14 within the housing 2. The disk 14 is formed with an annular groove 17 adjacent the disk 14 and in alignment with the openings 13 of the plate 11 so as to provide acoustic capacitance. The disk 16 is also provided with a plurality of openings 18 aligned with the openings 18 to provide acoustic resistance.

An insulating ring 19 which might be made of rubber, for example, rests against the lower surface relative to FIG. 1 of the disk 16 and an electrode ring 20 of electrical conducting material bears against the ring 19 and is provided with a downwardly extending electrode 21. The lower end relative to FIG. 1 of the metal housing 2 is upset as shown by numeral 5 to form the complete assembled unidirectional microphone. It is to be particularly noted that the electrode 21 is connected to the upset portion 5 of the housing 1 which in turn is connected through the ring 6 to the metallized film on the diaphragm 7 and the electrode 12 is integrally formed with the disk 11 and is attached to the electret film 10.

The exploded view of FIG. 2 provides a clear picture of the various elements of the microphone. It is to be realized that the filter disk 14 in combination with the groove 17 and the holes 18 form an acoustic phase shifter so as to obtain a unidirectional characteristic.

Figure 4:
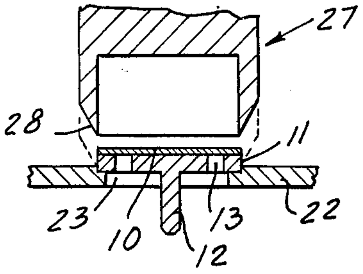
Figure 5:
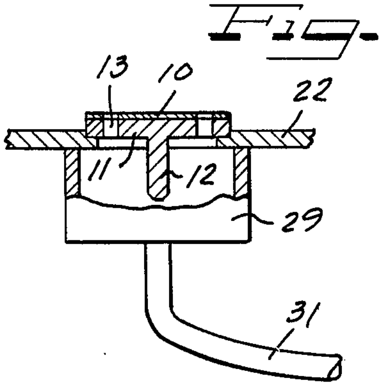

FIGS. 3, 4 and 5 illustrate one method of the invention for attaching the synthetic resin film to the backplate. The backplate 9 is positioned on a plate 22 formed with an opening 23 and with the electrode 12 extending therethrough and is heated to a temperature in the range between 280° C.–400° C. A synthetic resin sheet 24 which might be made of polytetrafluoroethylene or fluorinated ethylene-propylene copolymer (sold under the trademark Teflon FEP) is heated slightly so as not to cool the disk 11 of the backplate 9 and is then pushed downwardly by an air jet until it contacts the plate 11 initially at the center thereof and progressively outwardly until the sheet 24 covers all surfaces of the backplate 11 and is firmly attached thereto without air bubbles between the film 24 and the backplate 11. It has been discovered that if the temperature of the backplate is in the range between 280° C.–400° C. that very desirable and strong adhesion will result between the plate 11 and the film 24. On the other hand, if the plate 11 is heated to a temperature below 280° C. the adhesion between the film and the backplate is unreliable and an electret transducer with inadequate adhesion results. On the other hand, if the temperature of the backplate 11 is above 400° C. the synthetic resin sheet 24 tends to melt and becomes rough and thus poor frequency response is obtained.

Tests have been conducted to measure the force required to pull synthetic resin films from backplates wherein the films were attached to backplates having temperatures 280° C., 330° C. and 380° C. The following chart illustrates the tensile force required for films attached to backplates having different temperatures:

| Temperature ° C. | Tensile Force (Kg/cm²) |
|---|---|
| 380 | 35.8 |
| 330 | 26.0 |
| 280 | 13.5 |

In the pulling test a pulling speed of 50 mm/min. was utilized.

The superiority of the bond between the synthetic resin film and the backplate according to the method of this invention is illustrated by that fact that with prior art methods wherein an adhesive is used between the backplate and film a tensile force of only about 5.5 Kg/cm² is obtained which does not give sufficient strength for use as an electret transducer. At the lowest temperature tested in the method of the invention or at 280° C., tensile force of 13.5 Kg/cm² was obtained which is more than twice as strong a bond as that obtained by the prior art method of attaching with an adhesive. At a temperature of 380° C., a tensile force of more than six times greater than that of the prior art method of attaching with an adhesive was required to separate the film from the backplate.

After the sheet 24 is attached to the heated plate 11, it is cut with a cylindrically-shaped cutting blade 27 which has a knife edge 28, as shown in FIG. 4, which severs the edge of the film 24 flush with the edge of the plate 11.

Then a suction member comprising a hollow cylindrical member 29 is placed against the lower surface of the plate 22 surrounding the opening 23 and a suction line 31 applies suction until openings aligned with the openings 13 are formed in the film 10 due to the suction. The broken edges of the film 10 become attached to the inner surfaces of the holes 13 of the plate 11 because the plate 11 is still heated and a bond will occur.

Figure 6:
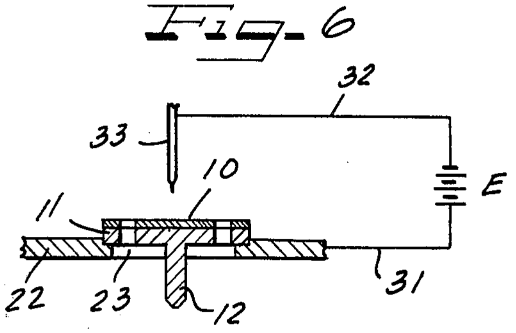

In the next step of the process, the film 10 is subjected to a voltage so as to form electrets. FIG. 6 illustrates one method wherein a D.C. voltage from a battery E which might be in the range between 7 K – 10 K volts is applied between a needle electrode 33 and the backplate 11 so as to cause a corona discharge therebetween. The end of the needle electrode 33 might be spaced from the backplate 9–10 mm. The resulting electret film 10 has a charge density of $10^{-4}$ q/m² which is satisfactory for use as an electret transducer.

Figure 7:
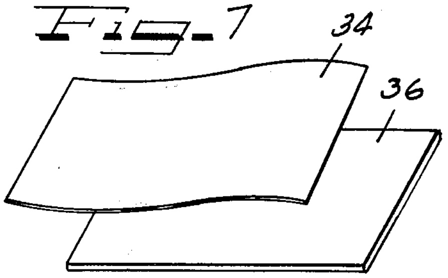
FIGS. 7, 8 and 9 illustrate a modified method for forming backplate electrets according to this invention.
Figure 8:
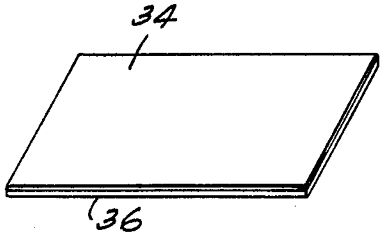
Figure 9:
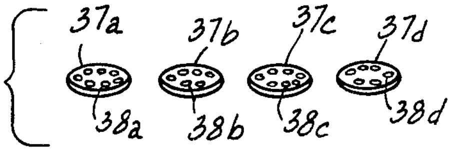

FIGS. 7, 8 and 9 illustrate another method for forming a backplate with a synthetic resin film attached thereto. In FIG. 7 a metal plate 36 is heated to temperature range between 280° C.–400° C. and a synthetic resin sheet 34 of the type utilized in the method of FIGS. 3–5 is brought into contact with the plate 36 and a bond results due to the temperature of the plate 36.

FIG. 8 illustrates the bonded sandwich of the sheet 34 with the plate 36. The bonded sandwich is then cut to form backplates 37 by suitable dies to form 37*a*, 37*b*, 37*c* and 37*d* illustrated in FIG. 9. Openings 38*a*, 38*b*, 38*c* and 38*d* are respectively formed in the backplates during the punching or cutting operation. A suitable electrode equivalent to the electrode 12 in the backplate illustrated in FIG. 1 may be attached to the members 37 on the side opposite the film 34 to provide a backplate which may be used in a microphone as for example illustrated in FIG. 1. The method utilized in FIG. 6 may be utilized to form electrets on the film 34.

Microphones according to the present invention have a very good frequency response and are reliable for long periods of time.

Although in the foregoing example, the backplate has been stated as being constructed of metal, as for example, aluminum, it is to be realized that the backplate may be constructed of a synthetic resin molded member which is provided with a conductive layer which forms an electrode thereon.

Although the invention has been described with respect to preferred embodiments, it is not to be so limited as changes and modifications may be made therein which are within the full intended scope as defined by the appended claims.

We claim:

1. In an electret transducer including a backplate having a flat conductive surface and an electret film formed thereon, the improved method of making said backplate comprising the steps of heating said backplate; contacting a synthetic resin film selected from the group consisting of polytetrafluoroethylene and fluorinated ethylenepropylene copolymer with said flat conductive surface of said heated backplate to secure said film thereon, said synthetic resin film having a capability of forming electret, charging said synthetic resin film to form an electret, wherein said backplate has a plurality of holes and a plurality of holes are formed in said film in alignment with said plurality of holes in said backplate and wherein said backplate is heated to the range 280°–400° C, and wherein contacting said resin film to said heated backplate is accomplished such that the film initially contacts a point on said backplate and from said point is progressively brought into contact with areas of said flat conductive surface.

2. In a method according to claim 1, wherein air pressure is used to move said film into contact with said backplate.

3. In an electret transducer including a backplate having a flat conductive surface and an electret film formed thereon, the improved method of making said backplate comprising the steps of heating said backplate member; contacting a synthetic resin film selected from the group consisting of polytetrafluoroethylene and fluorinated ethylene-propylene copolymer with said flat conductive surface of said heated backplate to secure said film thereon, said synthetic resin film having a capability of forming electret, charging said synthetic resin film to form an electret, wherein said backplate has a plurality of holes and a plurality of holes are formed in said film in alignment with said plurality of holes in said backplate and wherein said backplate is heated to the range between 280°–400° C., and wherein said plurality of holes in said film are formed by applying suction to a surface of said backplate away from said film so as to draw the portion of said film covering said plurality of holes into said plurality of holes in said backplate.

4. In a method according to claim 1, wherein said backplate is heated to the range between 300°–400° C.

5. In a method according to claim 1, wherein said backplate is heated to the range between 325°–390° C.

6. In a method according to claim 1, wherein said backplate is heated to about 380° C.

7. In a method according to claim 1, wherein said resin film is preheated before being brought into contact with said heated backplate.

* * * * *